United States Patent
Kouno

[11] Patent Number: 6,057,631
[45] Date of Patent: May 2, 2000

[54] PIEZOELECTRIC TRANSDUCING INVERTER

[75] Inventor: Makoto Kouno, Tokyo, Japan

[73] Assignee: NEC Corporation, Tokyo, Japan

[21] Appl. No.: 09/225,463

[22] Filed: Jan. 6, 1999

[30] Foreign Application Priority Data

Jan. 13, 1998 [JP] Japan ................................. 10-004977

[51] Int. Cl.[7] .................................................. H01L 41/08
[52] U.S. Cl. ............................................................. 310/316
[58] Field of Search ................................. 363/55, 56, 95, 363/97, 131; 310/316, 317, 318

[56] References Cited

U.S. PATENT DOCUMENTS

| | | | |
|---|---|---|---|
| 5,739,622 | 4/1998 | Zaitsu | 310/316 |
| 5,894,184 | 4/1999 | Furuhashi et al. | 310/316 |

FOREIGN PATENT DOCUMENTS 9-107684  4/1997  Japan .

*Primary Examiner*—Matthew Nguyen
*Attorney, Agent, or Firm*—Young & Thompson

[57] ABSTRACT

A piezoelectric transducing inverter which drives a piezoelectric transducer in high efficiency and is widely used in general and small sized and low cost and is capable of preventing the generation of smoke etc. is provided. Signals outputted from a frequency divider are inputted to the gates of two switching transistors respectively and a piezoelectric transducer is driven. At the piezoelectric transducing inverter from which a transduced voltage is outputted, at the time when the abnormal state that the electric connection between the frequency divider and either gate of the two switching transistors is lost occurs, by biasing the switching transistor, a current flows to a fuse and blows the fuse and prevents the generation of smoke etc. from the switching transistors caused by flowing a large current.

20 Claims, 10 Drawing Sheets

PIEZOELECTRIC TRANSDUCING INVERTER

BACKGROUND OF THE INVENTION

The present invention relates to a piezoelectric transducing inverter which in particular is able to prevent a switching transistor from generating smoke etc. at the time when the gate of the switching transistor is disconnected electrically.

DESCRIPTION OF THE RELATED ART

In the conventional technology, the piezoelectric transducing inverter utilizing a piezoelectric transducer is used, to transduce a DC (direct current) voltage to a desired AC (alternating current) voltage.

Generally, the piezoelectric transducer is an element in which a primary electrode and a secondary electrode are put on a piezoelectric material and a voltage of resonant frequency of the transducer is applied to the primary electrode and the piezoelectric material resonates and by this mechanical vibration a transduced voltage is outputted from the secondary electrode. Compared with an electromagnetic transducer, the piezoelectric material is capable of being small and thin sized and usable for a back light power supply of a liquid crystal display.

The piezoelectric transducer is an element which acts only in a narrow resonant frequency range, and when the piezoelectric transducer is driven outside the range of the resonant frequency, only the resonant frequency is able to be outputted from the secondary electrode of the piezoelectric transducer and the loss of energy occurs and the efficiency of the piezoelectric transducer is decreased. Therefore, it is important to drive the piezoelectric transducer at a frequency which does not include energy outside of the resonant frequency. To meet this objective, the conventional method drives the piezoelectric transducer by two half sine waves with different phases equivalent to the sine wave of the resonance frequency.

As an example of the conventional technology, the Japanese Patent Laid-Open Publication No. HEI 9-107684 discloses the driving circuit for the piezoelectric transducer. The in which this technology is applied to the piezoelectric transducing inverter is explained in FIG. 1.

As shown in FIG. 1, this piezoelectric transducing inverter 29 constitutes of a piezoelectric transducer 1, a booster 4, a frequency control circuit 3, a driving voltage control circuit 10, a dimmer 11 and a fuse 12 as main parts and an outputted voltage $V_O$ from the piezoelectric transducer 1 is inputted to a load 2.

The main parts shown in FIG. 1 are explained in detail. An AC voltage is inputted to a primary electrode of the piezoelectric transducer 1 and the piezoelectric transducer 1 outputs $V_O$ from a secondary electrode utilizing the piezoelectric effect.

A frequency divider 9 alternately drives a switching transistor 7 and a switching transistor 8 by alternately outputting pulses to each of their gates respectively. That is, the frequency divider 9 outputs respective gate signals $V_{g1}$ and $V_{g2}$ to the respective gates of the switching transistor 7 and the switching transistor 8 and alternately drives the switching transistor 7 and the switching transistor 8.

A current $I_0$ from the load 2 is inputted to the frequency control circuit 3 and the frequency control circuit 3 outputs a driving signal $V_r$ to the frequency divider 9 and the driving voltage control circuit 10. The driving voltage control circuit 10 controls the peak voltages of $V_{d1}$ and $V_{d2}$, thereby driving the piezoelectric transducer 1 with constant peak voltage values.

The dimmer 11 generates a driving stop signal for the driving voltage control circuit 10 and controls the driving on/off duty cycle, and also outputs a control signal to the frequency control circuit 3 which holds the VCO (voltage controlled oscillator) frequency during driving stop time. The fuse 12 is connected to a DC voltage $V_{DD}$. One end of a coil 5 is connected to one end of the primary electrode of the piezoelectric transducer 1 and the other end of the coil 5 is connected to the driving voltage control circuit 10.

The switching transistor 7 connects to the coil 5 and one end of the primary electrode of the piezoelectric transducer 1. One end of a coil 6 is connected to the other end of the primary electrode of the piezoelectric transducer 1 and the other end of the coil 6 is connected to the driving voltage control circuit 10.

The switching transistor 8 connects to the coil 6 and the other end of the primary electrode of the piezoelectric transducer 1.

With above mentioned construction, the piezoelectric transducing inverter 29 shown in FIG. 1 transduces the DC voltage $V_{DD}$ to the high AC voltage $V_O$, and supplies $V_O$ to the load 2.

In this construction, even if the DC voltage $V_{DD}$ fluctuates, a constant voltage and a constant current are able to be outputted to the load 2, and even if the input voltage range is wide, stable operation is able to be implemented. Moreover, the piezoelectric transducer 1 is driven by a sine wave or an approximate signal to a sine wave, and this driving frequency does not change, therefore decrease in transducing efficiency is prevented. Compared with an electromagnetic transducer, even if a high voltage more than 1000 V is generated, the piezoelectric transducer 1 is able to be small and thin sized.

Next, the operation of the conventional piezoelectric transducing inverter 29 shown in FIG. 1 is explained in detail. The switching transistors 7 and 8 are alternately turned on and off by the opposite phase clocks on $V_{g1}$ and $V_{g2}$ output from the frequency divider 9. The current from the DC power supply $V_{DD}$ is supplied to coils 5 and 6 and the current energy is thereby stored. At times when the switching transistors 7 and 8 are off, the stored energy in the coils is released, and a voltage higher than $V_{DD}$ is generated.

This voltage is formed to the voltage resonance waveform by the equivalent input capacity of the piezoelectric transducer 1 and the load 2 and the inductance of the coils, and is seen as a sine wave which becomes zero voltage over half the resonance cycle of the piezoelectric transducer 1 or a half wave of the approximate signal of this sine wave.

The generated voltage is alternately inputted to the primary electrode of the piezoelectric transducer 1, the equivalent wave of the sine wave or the approximate signal of the sine wave as the driving voltage makes the piezoelectric transducer 1 vibrate and the output voltage $V_O$ is increased by a boosting rate determined by the shape of the piezoelectric transducer 1, and is output from the secondary electrode. This voltage $V_O$ is applied to the load 2 and the feed back current $I_0$ through the load 2 is inputted to the frequency control circuit 3. The frequency control circuit 3 generates the frequency which drives the piezoelectric transducer 1 through the frequency divider 9 and sweeps the driving frequency until the feed back current $I_0$ becomes a predetermined value, and then maintains the predetermined value.

FIG. 2 is a block diagram showing the construction of the frequency control circuit 3. This frequency control circuit is used for the piezoelectric transducing inverter of both the conventional type and the present invention. Referring to FIG. 2, the frequency control circuit 3 is explained.

As shown in FIG. 2, the frequency control circuit 3 is constituted by a current/voltage converter 13, a rectifier 14, a comparator 15, an integrating circuit 16, a comparator 17 and a VCO (voltage controlled oscillator) 18.

The feed back current $I_0$ from the load 2 is converted to an AC voltage at the current/voltage converter 13 and converted to a DC voltage at the rectifier 14 and inputted to the comparator 15. The DC voltage is compared with a reference voltage $V_{ref}$ at the comparator 15 and the comparator 15 outputs a high level signal to the integrating circuit 16 at the time when the inputted voltage is small.

The integrating circuit 16 is constructed to work so that the output voltage increases at a certain rate during the period when a high level voltage is input to the VCO 18. The VCO 18 is a voltage controlled oscillator outputting a frequency which is in inverse proportion to the inputted voltage and the frequency divider 9 divides the oscillated frequency from the VCO 18 so that the piezoelectric transducer 1 is driven by this divided frequency. Therefore, in the case where a smaller voltage than the reference voltage $V_{ref}$ is inputted to the comparator 15, the driving frequency continues to decrease.

The characteristic of the driving frequency to the boosting rate of the piezoelectric transducer 1 is explained referring to FIG. 3. However, this characteristic is applied to both the conventional type and the present invention. Therefore, FIG. 3 is used for both the conventional type and the present invention.

As shown in FIG. 3, the driving frequency of the piezoelectric transducer 1 is set below $f_1$. Therefore, as the driving frequency approaches the resonance frequency $f_r$ which provides the highest boosting rate of the piezoelectric transducer 1, therefore the boosting rate of the piezoelectric transducer 1 increases and the output current of the piezoelectric transducer 1 increases with the passage of time. At the time when the voltage to be inputted to the comparator 15 becomes larger than the reference voltage $V_{ref}$ at the driving frequency $f_0$, the output voltage of the comparator 15 becomes low level.

With this signal, the output signal of the integrating circuit 16 maintains, before becoming low level, the output frequency of the VCO 18 at a constant value so that the piezoelectric transducer 1 is driven by a constant frequency.

When the load 2 shown in FIG. 1 is for example a cold cathode tube and the DC voltage $V_{DD}$ is low and the output voltage $V_0$ does not reach a discharge starting voltage, and the feed back current $I_0$ results in a low voltage input to the comparator 15.

Under this situation, the output of the comparator 15 shown in FIG. 2 remains at a high level and the driving frequency continues to decrease. The driving frequency becomes the frequency $f_2$ shown in FIG. 3, and the output of the integrating circuit 16, provided as the input to comparator 17 becomes larger than the reference voltage $V_{min}$, and comparator 17 outputs a high level signal to the integrating circuit 16. By this high level signal, the integrating circuit 16 is reset and the output voltage becomes the minimum voltage and the output of the VCO 18 becomes such that the frequency divider 9 outputs the frequency $f_1$. The driving frequency decreases from the frequency $f_1$ and the above mentioned operation is repeated, and when the DC voltage $V_{DD}$ is restored to the predetermined voltage, the cold cathode tube is able to be normally lighted.

Next, the construction of the driving voltage control circuit 10 shown in FIG. 1 is explained referring to FIG. 4. FIG. 4 is a block diagram showing the construction of the driving voltage control circuit 10. This driving voltage control circuit 10 is used for both the conventional type and the present invention.

As shown in FIG. 4, the driving voltage control circuit 10 divides and rectifies a drain voltage waveform $V_{d1}$ of the switching transistor 7 at a voltage dividing rectifier 20 and outputs the divided and rectified voltage $V_c$. The voltage $V_c$ is inputted to a non-reversed input terminal of a comparator 19 and a triangular wave $V_r$ from the frequency control circuit 3 is inputted to a reversed input terminal of the comparator 19 and the compared result is inputted to a gate of a switching transistor 21. The driving voltage control circuit 10 is constructed as mentioned above.

FIG. 5 is a timing chart showing the timing of the voltage $V_c$ obtained by dividing and rectifying the drain voltage waveform $V_{d1}$, the triangular wave $V_r$ from the frequency control circuit 3, a gate voltage $V_{g3}$ of the switching transistor 21, outputted voltages $V_{g1}$ and $V_{g2}$ from the frequency divider 9, the drain voltage waveform $V_{d1}$ of the switching transistor 7 and a drain voltage waveform $V_{d2}$ of the switching transistor 8.

This timing chart is not used for only the conventional type, this timing chart is used for both the conventional type and the present invention discussed later.

As shown in FIG. 5, when the drain voltage is high, the non-reversed input terminal voltage $V_c$ becomes large, and the larger the voltage $V_c$ inputting to the comparator 19 is, the larger the time ratio output of the gate voltage $V_{g3}$ of the switching transistor 21 is.

With this, the open time between a source and a drain of the switching transistor 21 of the driving voltage control circuit 10 shown in FIG. 4 is long and the input power to the booster 4 is small, therefore the control feature used when the drain voltages $V_{d1}$ and $V_{d2}$ of the switching transistors become low is implemented. At the time when the drain voltage is low., the non-reversed input terminal voltage $V_c$ becomes small, the smaller the voltage $V_c$ inputting to the comparator 19 is, the smaller the time ratio output of the gate voltage $V_{g3}$ of the switching transistor 21 is. With this, the open time between the source and the drain of the switching transistor 21 is short and the input power to the booster 4 is large, therefore the control feature used when the drain voltages $V_{d1}$ and $V_{d2}$ of the switching transistors become high is implemented.

By this continuous control, the drain voltages $V_{d1}$ and $V_{d2}$ of the switching transistors are controlled to some certain voltages and the operation which makes the voltage driving the piezoelectric transducer 1 stay at a certain level is able to be implemented, even when the DC voltage $V_{DD}$ fluctuates in a wide range, the piezoelectric transducer 1 is able to be steadily operated.

Next, the construction of the dimmer 11 shown in FIG. 1 is explained. FIG. 6 is a block diagram showing the construction of the dimmer 11. This dimmer 11 is used for both the conventional type and the present invention.

As shown in FIG. 6, the dimmer 11 is constituted by a triangular wave oscillator 22 which oscillates a dimmer frequency lower than the driving frequency and a comparator 23. The comparator 23 compares a dimmer voltage with the outputted waveform of the triangular wave oscillator 22 and the dimmer 11 outputs a pulse signal having varied duties.

This signal is outputted to the frequency control circuit 3 and the driving voltage control circuit 10, and while this signal is high level the switching transistor 21 is switched off and the driving of the piezoelectric transducer 1 is stopped and the output power of the integrating circuit 16 is so as not to change the frequency of the VCO 18.

With this construction, it is said that the conventional piezoelectric transducing inverter is small and thin sized and is capable of operating in a wide input voltage range with high efficiency. Besides this, the conventional piezoelectric transducing inverter has been required to be further reduced in size and cost.

To achieve these objectives an IC (integrated circuit) including all functions is an ideal, however, rather than constructing the small signal circuits of the frequency control circuit 3, the frequency divider 9, the driving voltage control circuit 10 excluding switching transistor 21 and the diode 30 and the dimmer 11, and the high power parts of the switching transistor 7, the switching transistor 8, the switching transistor 21 and the diode 30 are placed on one IC chip, construction in which the switching transistors and diodes are placed outside of the IC is suitable for higher general use and is applicable for both the high power output case and the low power output case.

Therefore, it is said that by the construction which the small signal circuit parts of the frequency control circuit 3, the frequency divider 9, the driving voltage control circuit 10 and the dimmer 11 are on IC chip, and the high power parts of the switching transistors 7 and 8 made small sized with low cost resin packaging and are placed outside of the IC, the piezoelectric transducer 1 is driven in high efficiency and small size and low cost is able to be achieved by the conventional type shown in FIG. 1.

However, the conventional piezoelectric transducing inverter shown in FIG. 1 has the following problems. Referring to drawings, these problems are explained below.

As shown in FIG. 1, the conventional piezoelectric transducing inverter needs the electric connection between the frequency divider 9 and the switching transistors 7 and 8 on the mounting substrate, therefore the poor soldering of the Q output terminal or the reverse Q output terminal of the frequency divider 9 or the breaking of the pattern wiring may cause an abnormal state.

For example, in FIG. 1, the case that the 'a" point of the pattern wiring between the reverse Q output terminal of the frequency divider 9 and the gate of the switching transistor 8 is broken and the gate of the switching transistor 8 is placed in an open state, and wherein the switching transistor 7 is driven by the Q output of the frequency divider 9 and only one side is driven is explained.

The operating waveform of the piezoelectric transducing inverter of the conventional type is shown in FIG. 7. In this case, N channel MOSFET is used for respective switching transistors. In FIG. 7, the period from $t_1$ to $t_2$ is the normal operating time that the switching transistor 7 and the switching transistor 8 are alternately driven at the opposite phase clock by the frequency divider 9 and the period after $t_3$ is the abnormal operating time that only the switching transistor 7 is driven by the frequency divider 9 at the time when the point "a" is broken.

The energy stored in the coil 5 during the period from $t_2$ to $t_3$ is discharged during the period from $t_3$ to $t_4$, however the drain voltage $V_{d1}$ of the switching transistor 7 becomes the waveform (d) in FIG. 7, because the resonance condition is collapsed.

This $V_{d1}$ is capacitively coupled with the drain of the switching transistor 8 by the input capacity of the piezoelectric transducer 1, therefore the drain voltage $V_{d2}$ of the switching transistor 8 becomes the waveform (e) in FIG. 7.

The waveform of $V_{d2}$ during the period between $t_3$ and $t_4$ is that where the DC part of the waveform of $V_{d1}$ is cut, therefore the electric potential of the primary electrode at the $V_{d1}$ side of the piezoelectric transducer 1 becomes high.

At time $t_4$, the switching transistor 7 is turned on and $V_{d1}$ becomes 0 V, however the amount of the electric charge charged in the input capacity of the piezoelectric transducer 1 does not change at the instant before and after $t_4$, therefore $V_{d2}$ becomes a negative voltage.

However, the N channel MOSFET effectively has a diode D between the drain and the source and a capacitance C between the gate and the drain in its construction shown in FIG. 8, therefore $V_{d2}$ is capacitively coupled with the open gate switching transistor 8 by the parasitic capacitance C, and the gate waveform of $V_{g2}$ occurs shown in (g) in FIG. 7. The switching transistor 8 is biased by this voltage and is turned on and at the time $V_{d2}$ becomes a negative voltage, the parasitic diode D is placed in a conductive state and the drain current $I_{d2}$ flows a large current as shown in (i) in FIG. 7.

In FIG. 1, the drain current $I_{d2}$ flows in the closed circuit constituted by the coil 5, coil 6, the switching transistor 7 and the switching transistor 8, therefore the large current of the drain current $I_{d2}$ does not flow in the fuse 12. Therefore, the circuit operation does not stop and only the switching transistor 7 is continuously driven. With this, $I_{d2}$ shown in (i) in FIG. 7 flows in the switching transistor 8 and the switching transistor 8 gradually generates heat and if continued beyond the allowable amount of heat the switching transistor 8 generates smoke or fire or a burst. Hereinafter this generation of smoke or fire or a burst is referred to as the generation of smoke.

This problem of generating smoke is a real problem of circuit construction which generates an equivalent signal of sine wave or an approximate signal of this equivalent signal by the coil 5 and the switching transistor 7 and the coil 6 and the switching transistor 8 in order to drive the piezoelectric transducer 1 in high efficiency.

Even in the case where the coils are replaced by electromagnetic transformers, the generation of smoke occurs. Actually, in a piezoelectric transducer driving circuit which applies 12 V as the DC voltage $V_{DD}$ and uses a fuse rating current of 1.25 A, an electromagnetic transformer whose turn ratio of a primary side to a secondary side is 1 to 2 and which connects as an auto transformer, using 2SK2111 transistors as the switching transistors and outputs about 4 W to the load 2 in normal operation, in the case of an abnormal state in which the electric connection between the frequency divider 9 and either gate of the switching transistors 7 and 8 is broken, after a few tens of seconds the switching transistor generates smoke.

Product safety is strongly required and the generation of fire or smoke or a burst is a big problem. To prevent these problems, safety improvement must be achieved.

SUMMARY OF THE INVENTION

It is therefore an object of the present invention to provide a piezoelectric transducing inverter which efficiently drives a piezoelectric transducer and is highly generalized and is small sized and low cost and is able to prevent the generation of smoke and so forth.

According to a first aspect of the present invention, in a piezoelectric transducing inverter which provides a booster means having a piezoelectric transducer that is inputted a voltage from a primary electrode and outputs an AC voltage at a secondary electrode utilizing a piezoelectric effect, a first coil whose one end is connected to one side of the primary electrode of said piezoelectric transducer, a first switching transistor whose one end is connected to one side of the primary electrode of said piezoelectric transducer, a second coil whose one end is connected to the other side of the primary electrode of said piezoelectric transducer, a second switching transistor whose one end is connected to the other side of the primary electrode of said piezoelectric transducer, and a frequency divider which outputs gate signals to alternately drive said first switching transistor and said second switching transistor respectively, the present invention provides a first resistor whose one end is connected to the gate of said first switching transistor and whose the other end is connected to a fuse or a DC power supply and a second resistor whose one end is, connected to the gate of said second switching transistor and whose the other end is connected to said fuse or said DC power supply.

According to a second aspect of the present invention, as applied in the first aspect, the piezoelectric transducing inverter provides a third switching transistor which is connected to the other end of said first coil and the other end of said second coil, a diode which is connected to the other end of said first coil and the other end of said second coil and a driving voltage control circuit which controls the driving voltage of said piezoelectric transducer to a predetermined voltage by on/off control of said third switching transistor.

According to a third aspect of the present invention, as applied in the first aspect, the resistance values of said first resistor and said second resistor are high enough not to hinder the driving capability of said first switching transistor and said second switching transistor by said frequency divider.

According to a fourth aspect of the present invention, in the piezoelectric transducing inverter which provides a booster means having a piezoelectric transducer that is inputted a voltage from a primary electrode and outputs an AC voltage at a secondary electrode utilizing a piezoelectric effect, a first coil whose one end is connected to one side of the primary electrode of said piezoelectric transducer, a first switching transistor whose one end is connected to one side of the primary electrode of said piezoelectric transducer, a second coil whose one end is connected to the other side of the primary electrode of said piezoelectric transducer, a second switching transistor whose one end is connected to the other side of the primary electrode of said piezoelectric transducer, and a frequency divider which outputs gate signals to alternately drive said first switching transistor and said second switching transistor respectively, the present invention provides a constant-voltage circuit outputting a constant DC voltage, a first resistor whose one end is connected to the gate of said first switching transistor and whose the other end is connected to said constant-voltage circuit and a second resistor whose one end is connected to the gate of said second switching transistor and whose the other end is connected to said constant-voltage circuit.

According to a fifth aspect of the present invention, as applied in the fourth aspect, the piezoelectric transducing inverter provides a third switching transistor which is connected to the other end of said first coil and the other end of said second coil, a diode which is connected to the other end of said first coil and the other end of said second coil and a driving voltage control circuit which controls the driving voltage of said piezoelectric transducer to a predetermined voltage by on/off control of said third switching transistor.

According to a sixth aspect of the present invention, as applied in the fourth aspect, the resistance values of said first resistor and said second resistor are high enough not to hinder the driving capability of said first switching transistor and said second switching transistor by said frequency divider.

According to a seventh aspect of the present invention, in the piezoelectric transducing inverter which provides a booster means having a piezoelectric transducer that is inputted a voltage from a primary electrode and outputs an AC voltage at a secondary electrode utilizing a piezoelectric effect, a first coil whose one end is connected to one side of the primary electrode of said piezoelectric transducer, a first switching transistor whose one end is connected to one side of the primary electrode of said piezoelectric transducer, a second coil whose one end is connected to the other side of the primary electrode of said piezoelectric transducer, a second switching transistor whose one end is connected to the other side of the primary electrode of said piezoelectric transducer, and a frequency divider which outputs gate signals to alternately drive said first switching transistor and said second switching transistor respectively, the present invention provides a first resistor whose one end is connected to the gate of said first switching transistor and whose the other end is connected to a fuse or a DC power supply, a second resistor whose one end is connected to the gate of said second switching transistor and whose the other end is connected to said fuse or said DC power supply, a third resistor whose one end is connected to the gate of said first switching transistor and whose the other end is connected to a ground and a fourth resistor whose one end is connected to the gate of said second switching transistor and whose the other end is connected to a ground.

According to a eighth aspect of the present invention, as applied in the seventh aspect, the piezoelectric transducing inverter provides a third switching transistor which is connected to the other end of said first coil and the other end of said second coil, a diode which is connected to the other end of said first coil and the other end of said second coil, and a driving voltage control circuit which controls the driving voltage of said piezoelectric transducer to a predetermined voltage by on/off control of said third switching transistor.

According to a ninth aspect of the present invention, as applied in the seventh aspect, the resistance values of said first resistor, said second resistor, said third resistor and said fourth resistor are high enough not to hinder the driving capability of said first switching transistor and said second switching transistor by said frequency divider.

According to a tenth aspect of the present invention, in the piezoelectric transducing inverter which inputs the signals outputted from the frequency divider to the gates of the two switching transistors respectively and drives the piezoelectric transducer and outputs a transduced voltage, at the time when an abnormal state wherein the electric connection between said frequency divider and either gate of said two switching transistors is lost occurs, the piezoelectric transducing inverter biases said switching transistor and flows a current to the fuse and blows the fuse and prevents the generation of smoke.

According to a eleventh aspect of the present invention, as applied in the tenth aspect, in order to flow the current to said fuse, said two switching transistors have resistors respectively whose one end is connected to the gate of the switching transistor and whose the other end is connected to said fuse or the DC power supply.

According to a twelfth aspect of the present invention, as applied in the tenth aspect, in order to flow the current to said fuse, said two switching transistors have resistors respectively whose one end is connected to the gate of the switching transistor and whose the other end is connected to the constant-voltage circuit supplying a constant DC voltage and said constant-voltage circuit is connected to said fuse or said DC power supply.

According to a thirteenth aspect of the present invention, as applied in the tenth aspect, in order to flow the current to said fuse, said two switching transistors provide respectively a first resistor whose one end is connected to the gate of the switching transistor and whose the other end is connected to said fuse or the DC power supply, and a second resistor whose one end is connected to the gate of said switching transistor and whose the other end is connected to a ground.

Therefore, the piezoelectric transducing inverter of the present invention efficiently drives the piezoelectric transducer and is widely used in general and provides a driving circuit of the piezoelectric transducer which is small sized and low cost. Moreover, the piezoelectric transducing inverter adds pull-up resistors and voltage dividing resistors to the gates of the two switching transistors, and at the time when an abnormal state that an electric connection between either gate of switching transistors and the frequency divider driving these switching transistors is lost by a breaking of wire etc. occurs, makes an electric route which flows a large current to a fuse by biasing and makes the fuse blow and prevents the generation of smoke and improves the safety.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 9:
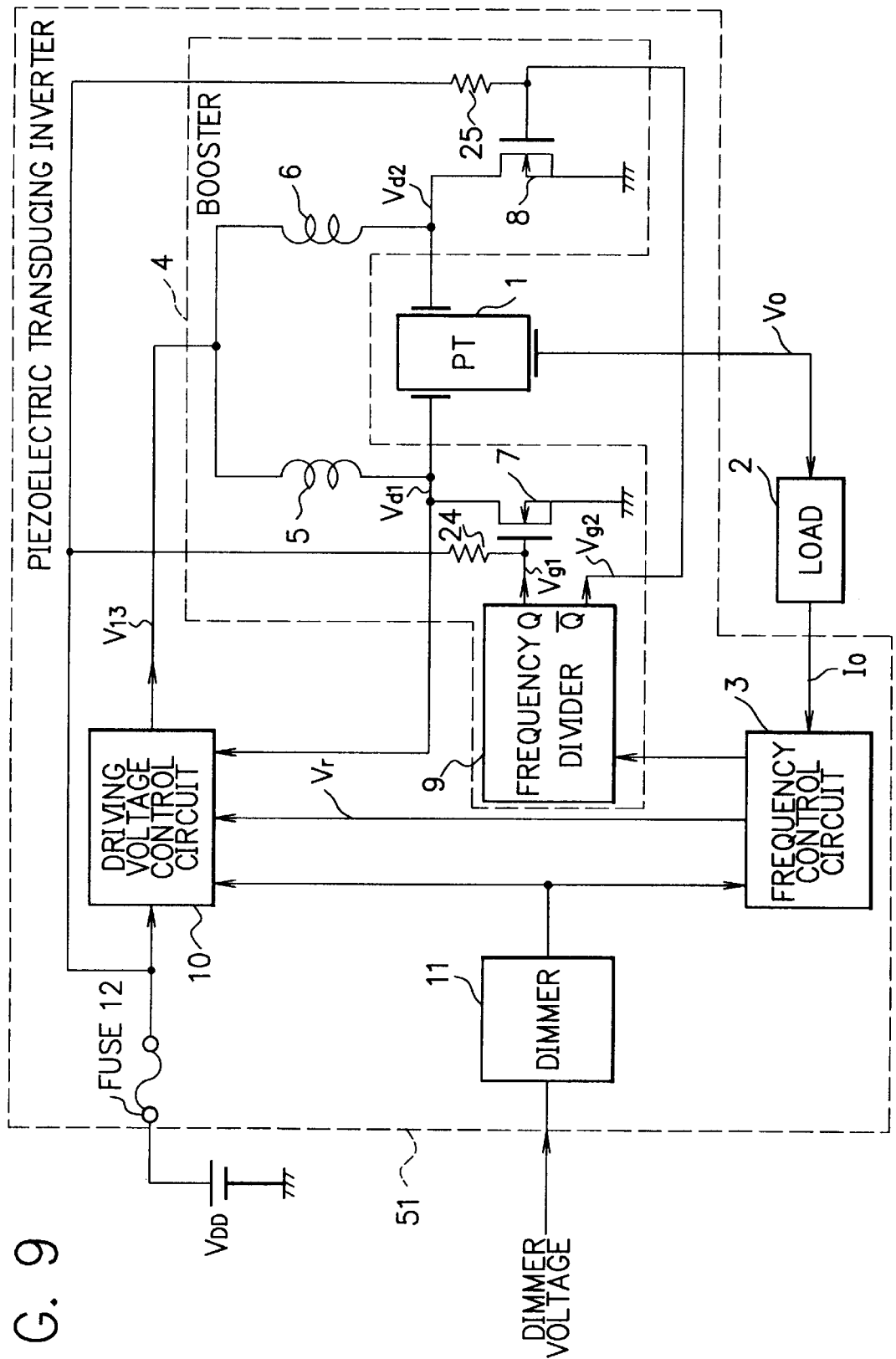
FIG. 9 is a block diagram showing the construction of a first embodiment of the piezoelectric transducing inverter of the present invention.
Figure 10:
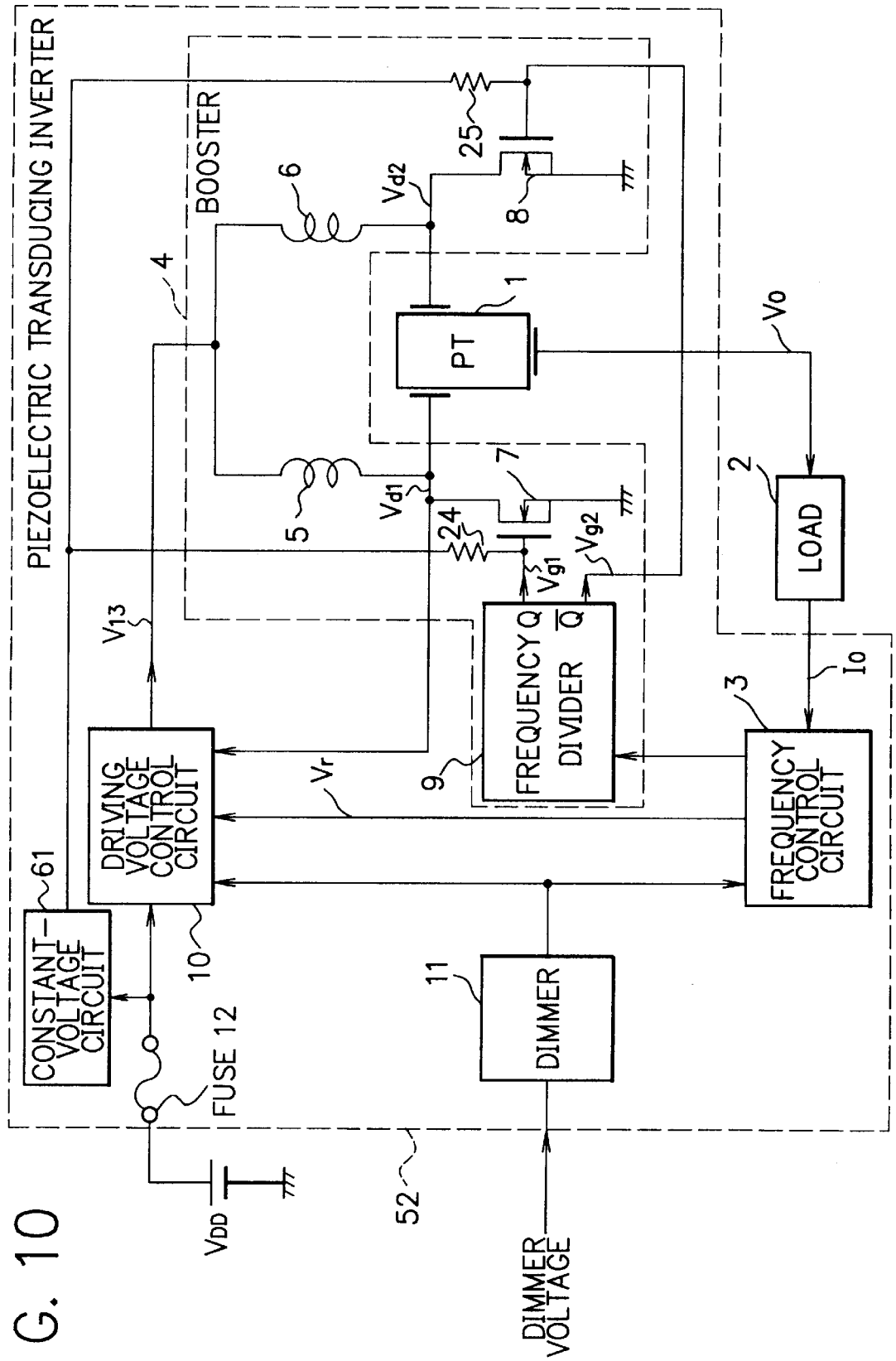
FIG. 10 is a block diagram showing the construction of a second embodiment of the piezoelectric transducing inverter of the present invention.
Figure 11:
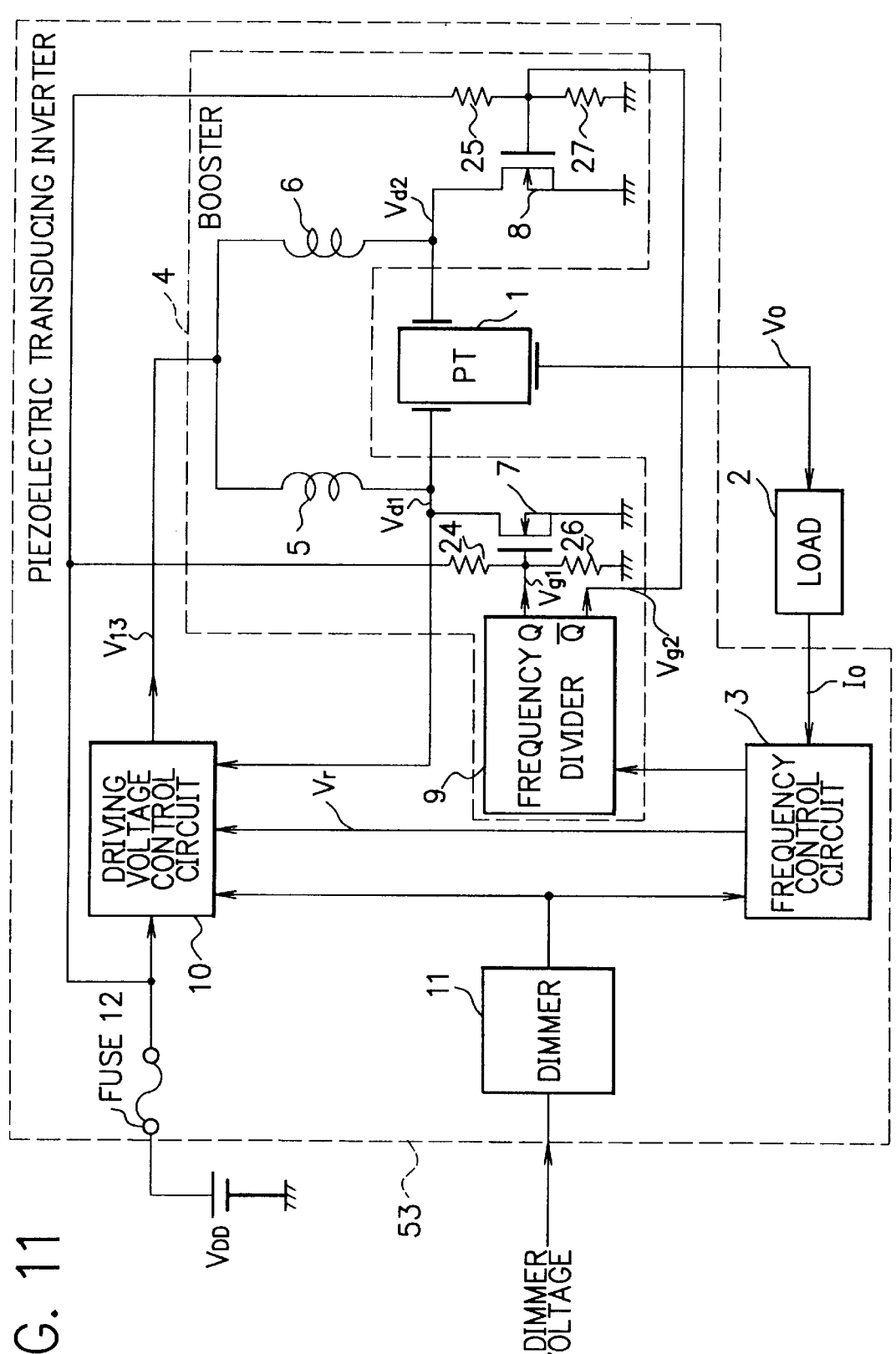
FIG. 11 is a block diagram showing the construction of a third embodiment of the piezoelectric transducing inverter of the present invention.

Referring now to the drawings, the operation of the piezoelectric transducing inverter of the present invention is explained. FIGS. 9, 10 and 11 show a first, a second and a third embodiment of the present invention respectively.

In FIGS. 9, 10 and 11, wherein switching transistors 7 and 8 are alternately driven by a clock of a frequency divider 9, at the time when one of the switching transistors is not driven by the frequency divider 9 by a breaking of pattern wire between either gate of the switching transistors 7 and 8 and the frequency divider 9, the switching transistor is biased by the resistor added to the gate of the switching transistor and an electric route flowing a large current to a fuse 12 is made and makes the fuse 12 blow and stops the operation of the circuit and prevents the generation of smoke. The resistors added to the gate of the switching transistor are pull-up resistors 24 and 25 shown in FIGS. 9 and 10, or a voltage dividing resistance made by the pull-up resistor 24 and a pull-down resistor 26, or a voltage dividing resistance made by the pull-up resistor 25 and a pull-down resistor 27 in FIG. 11.

That is, in the piezoelectric transducing inverter in which two switching transistors drive a piezoelectric transducer, during an abnormal state wherein the electric connection between the frequency divider and either gate of the two switching transistors is lost, the present invention biases the switching transistor by the pull-up resistor or the voltage dividing resistance and changes the current route of a drain current to the route via the fuse and blows the fuse and stops the operation of the circuit and prevents the generation of smoke etc.

Next, referring to the drawings, embodiments of the present invention are explained in detail. FIG. 9 is a block diagram showing the construction of a first embodiment of the piezoelectric transducing inverter of the present invention.

As shown in FIG. 9, the first embodiment of the piezoelectric transducing inverter 51 of the present invention provides a piezoelectric transducer 1 which an AC voltage is inputted from a primary electrode and outputs from a secondary electrode utilizing the piezoelectric effect, a booster 4 which converts a DC voltage $V_{DD}$ to a sine wave or an approximate signal of the sine wave and drives the piezoelectric transducer 1 and a frequency divider 9 which alternately drives switching transistors 7 and 8 by a clock.

Moreover, the piezoelectric transducing inverter 51 provides a frequency control circuit 3 which outputs a driving signal to the frequency divider 9, a driving voltage control circuit 10 which controls the peak voltage of $V_{d1}$ and $V_{d2}$ driving the piezoelectric transducer 1 to a constant value, a dimmer 11 which generates a driving stop signal to the driving voltage control circuit 10 and implements the duty control of driving on/off and outputs a control signal to the frequency control circuit 3 not to change the frequency of VCO (voltage controlled oscillator) during the drive stopping and a fuse 12 connecting to a DC power supply $V_{DD}$.

Furthermore, the piezoelectric transducing inverter 51 provides a coil 5 which connects to one side of the primary electrode of the piezoelectric transducer 1 and the driving voltage control circuit 10, the switching transistor 7 which connects to the coil 5 and one side of the primary electrode of the piezoelectric transducer 1, a pull-up resistor 24 which connects to the gate of the switching transistor 7, a coil 6 which connects to the other side of the primary electrode of the piezoelectric transducer 1 and the driving voltage control circuit 10, the switching transistor 8 which connects to the coil 6 and the other side of the primary electrode of the piezoelectric transducer 1 and a pull-up resistor 25 which connects to the gate of the switching transistor 8.

As stated above, the piezoelectric transducing inverter 51 shown in FIG. 9 converts the DC voltage $V_{DD}$ to a sine wave or an approximate signal of the sine wave utilizing two sets of a coil and a switching transistor and drives the piezoelectric transducer 1 and transduces the signal to a high AC voltage $V_0$ and supplies the voltage $V_0$ to a load 2.

Figure 1:
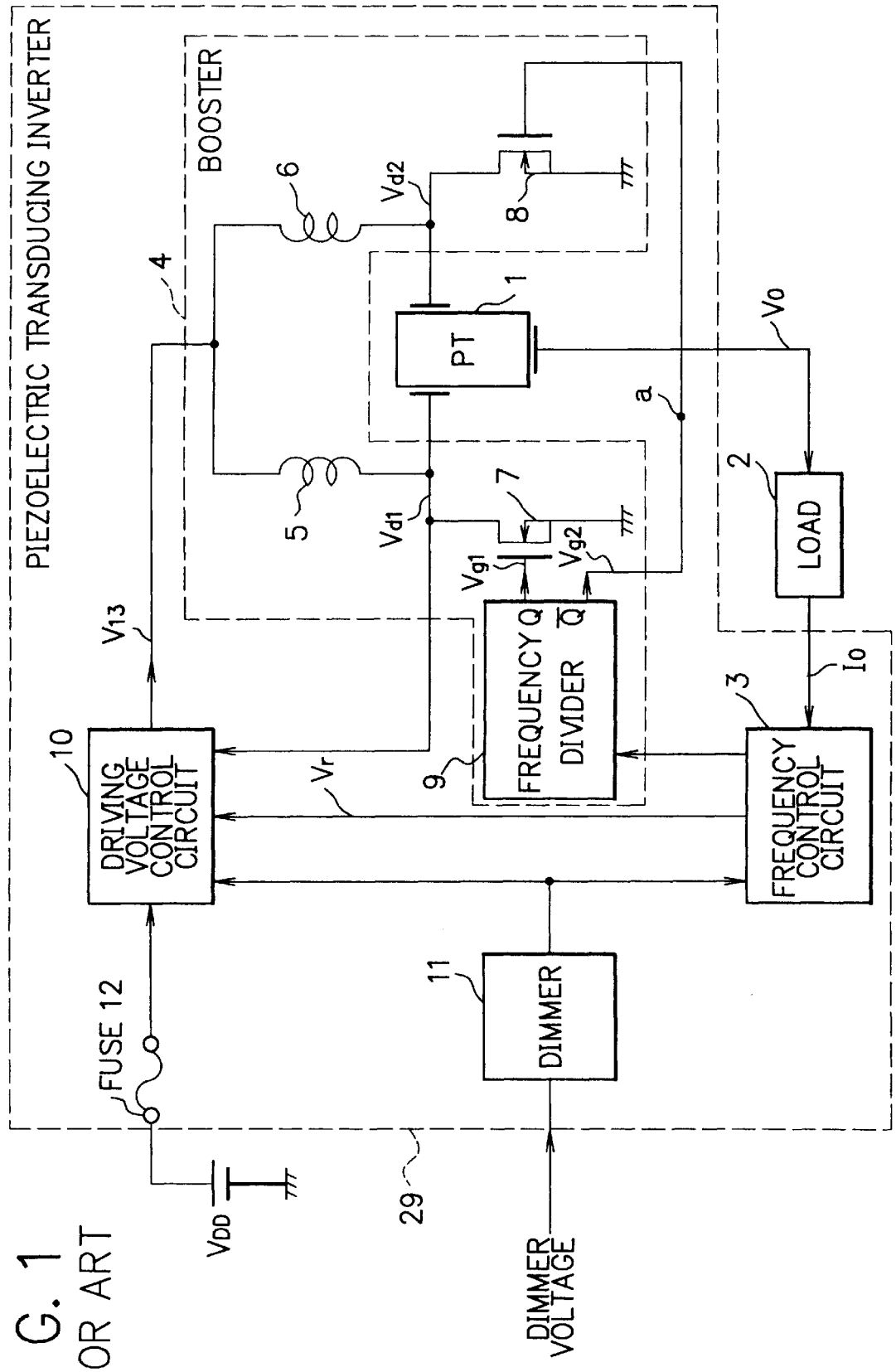
FIG. 1 is a block diagram showing the construction of a piezoelectric transducing inverter of the conventional type.
Figure 2:
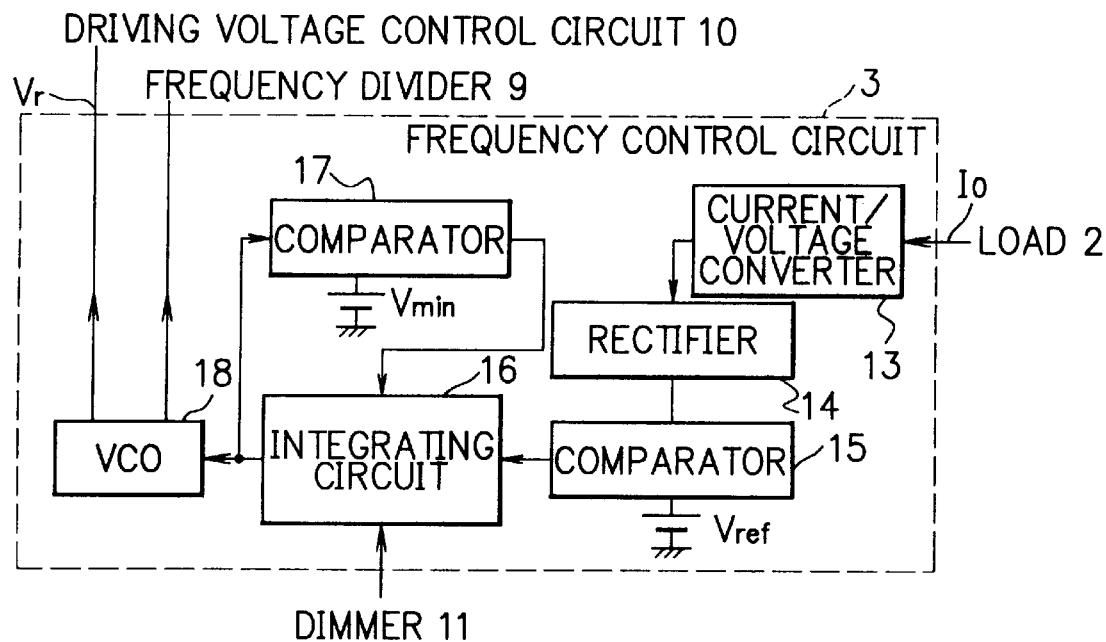
FIG. 2 is a block diagram showing an example of the construction of a frequency control circuit provided in the piezoelectric transducing inverter of the conventional type and the present invention.
Figure 3:
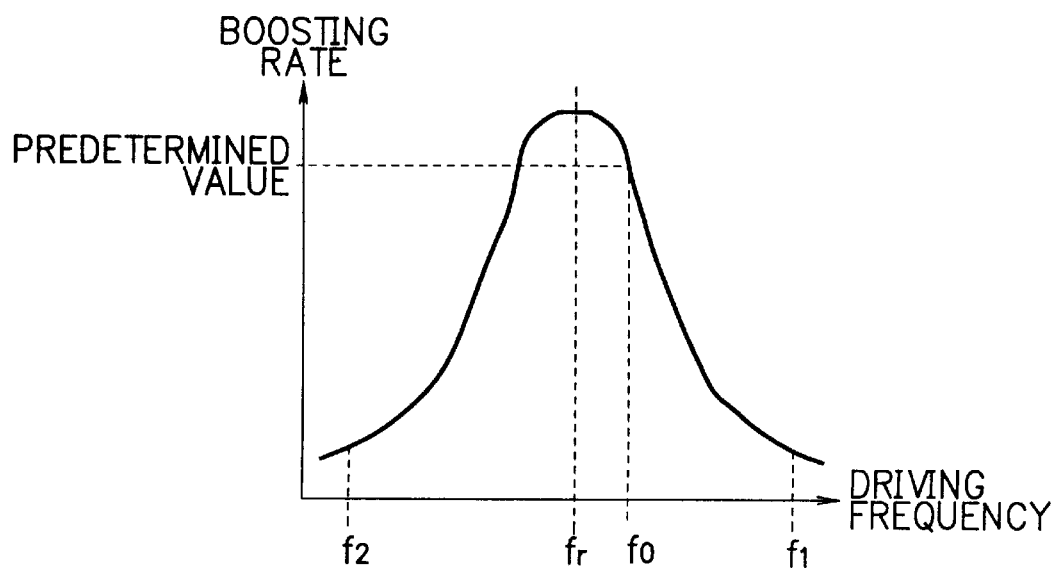
FIG. 3 is a graph showing the operation between a driving frequency and a boosting rate characteristic of the conventional type and the present invention.
Figure 4:
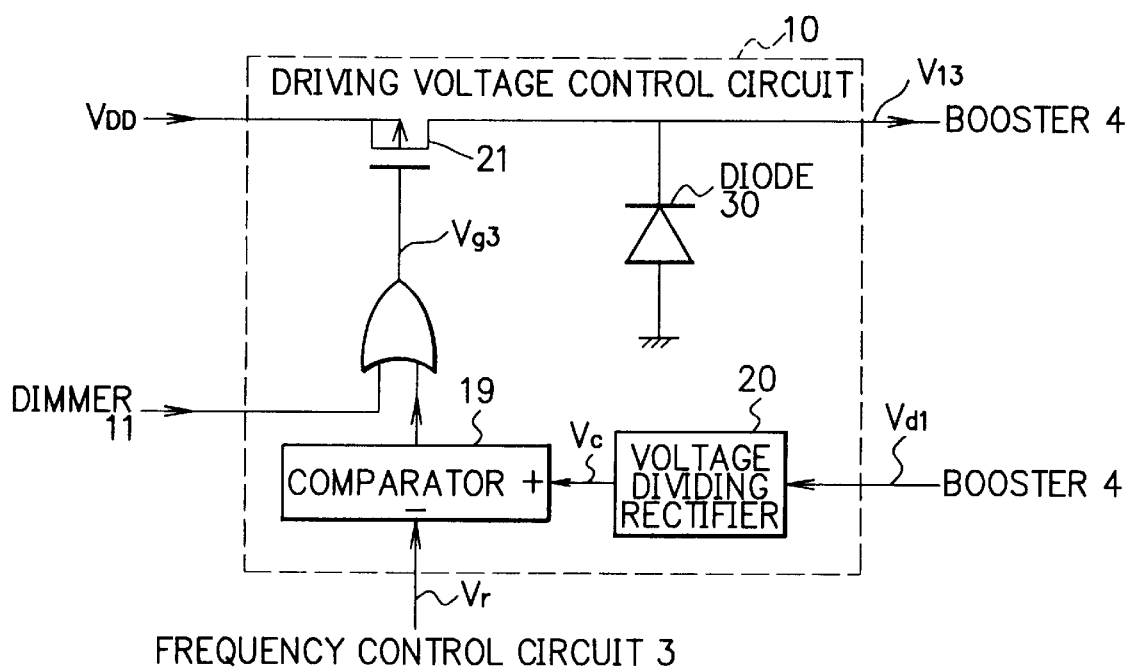
FIG. 4 is a block diagram showing an example of the construction of a driving voltage control circuit provided in the piezoelectric transducing inverter of the conventional type and the present invention.
Figure 5:
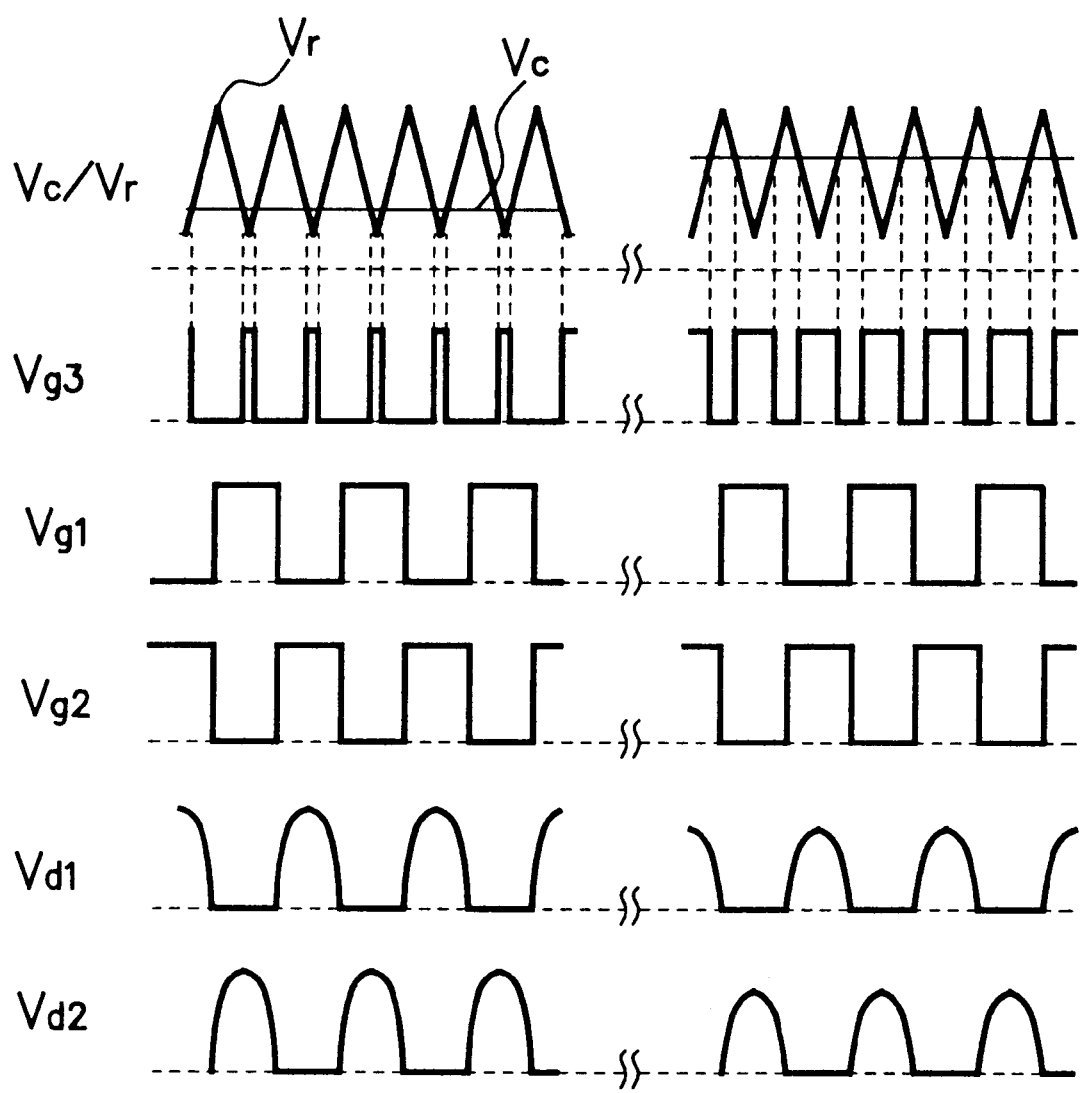
FIG. 5 is a timing chart showing an example of the operation of the piezoelectric transducing inverter of the conventional type and the present invention.
Figure 6:
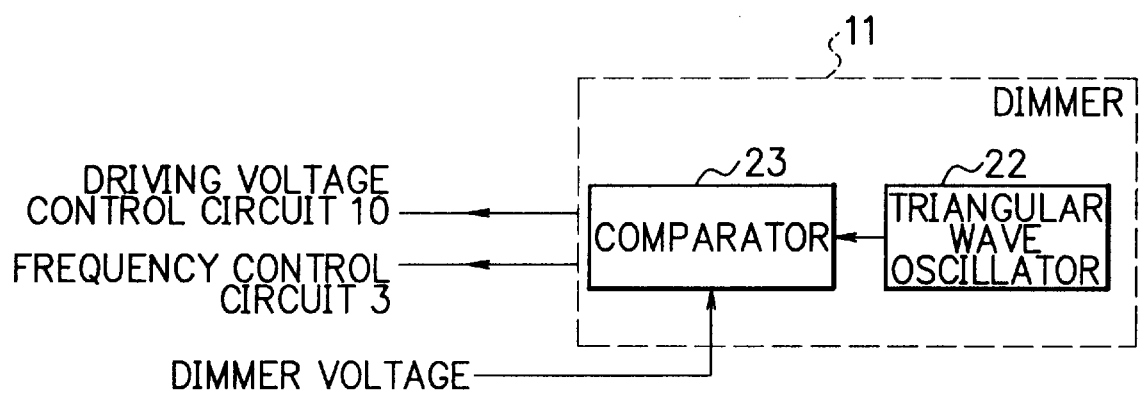
FIG. 6 is a block diagram showing an example of the construction of a dimmer provided in the piezoelectric transducing inverter of the conventional type and the present invention.
Figure 7:
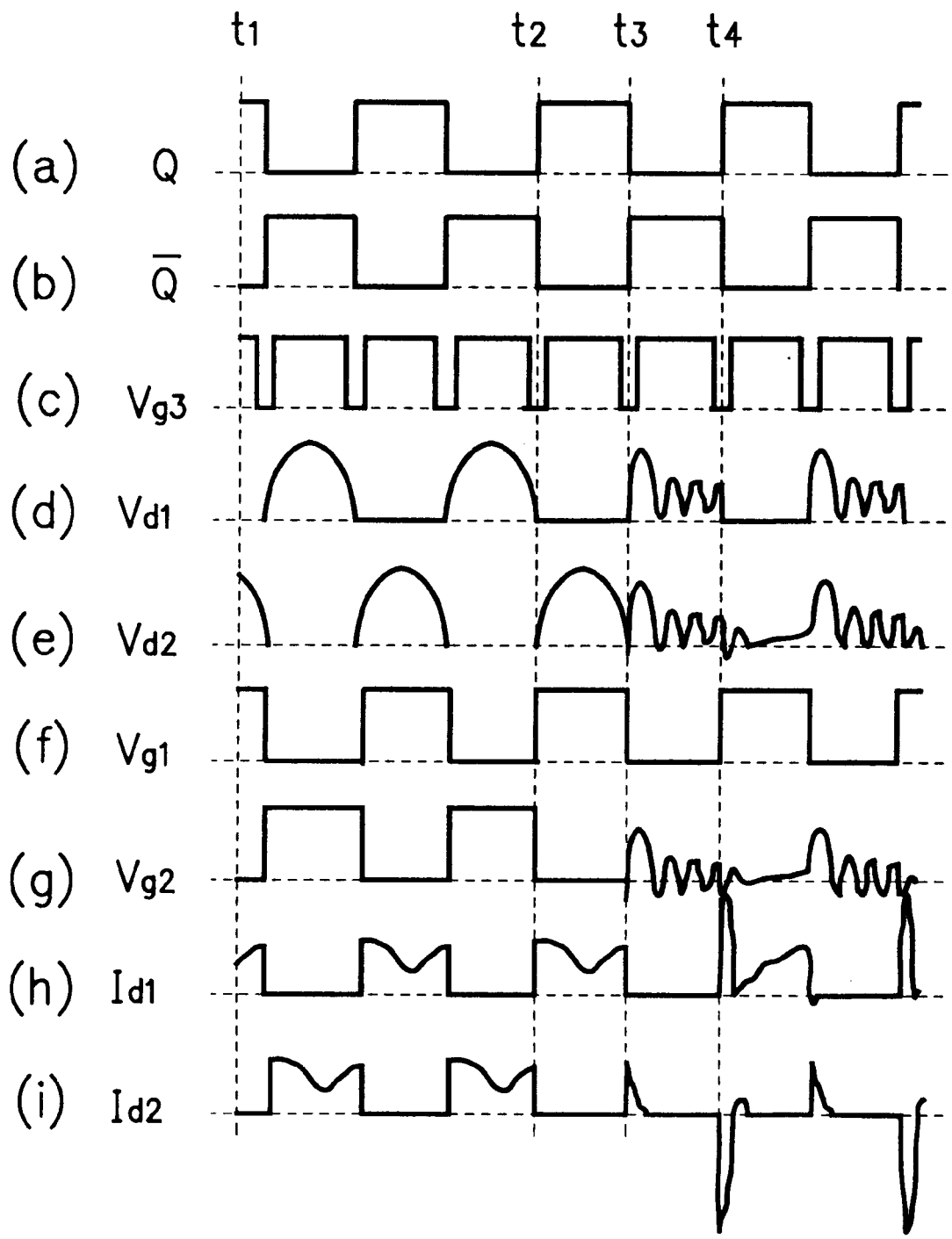
FIG. 7 is a timing chart showing the operation of the piezoelectric transducing inverter shown in FIG. 1.
Figure 8:
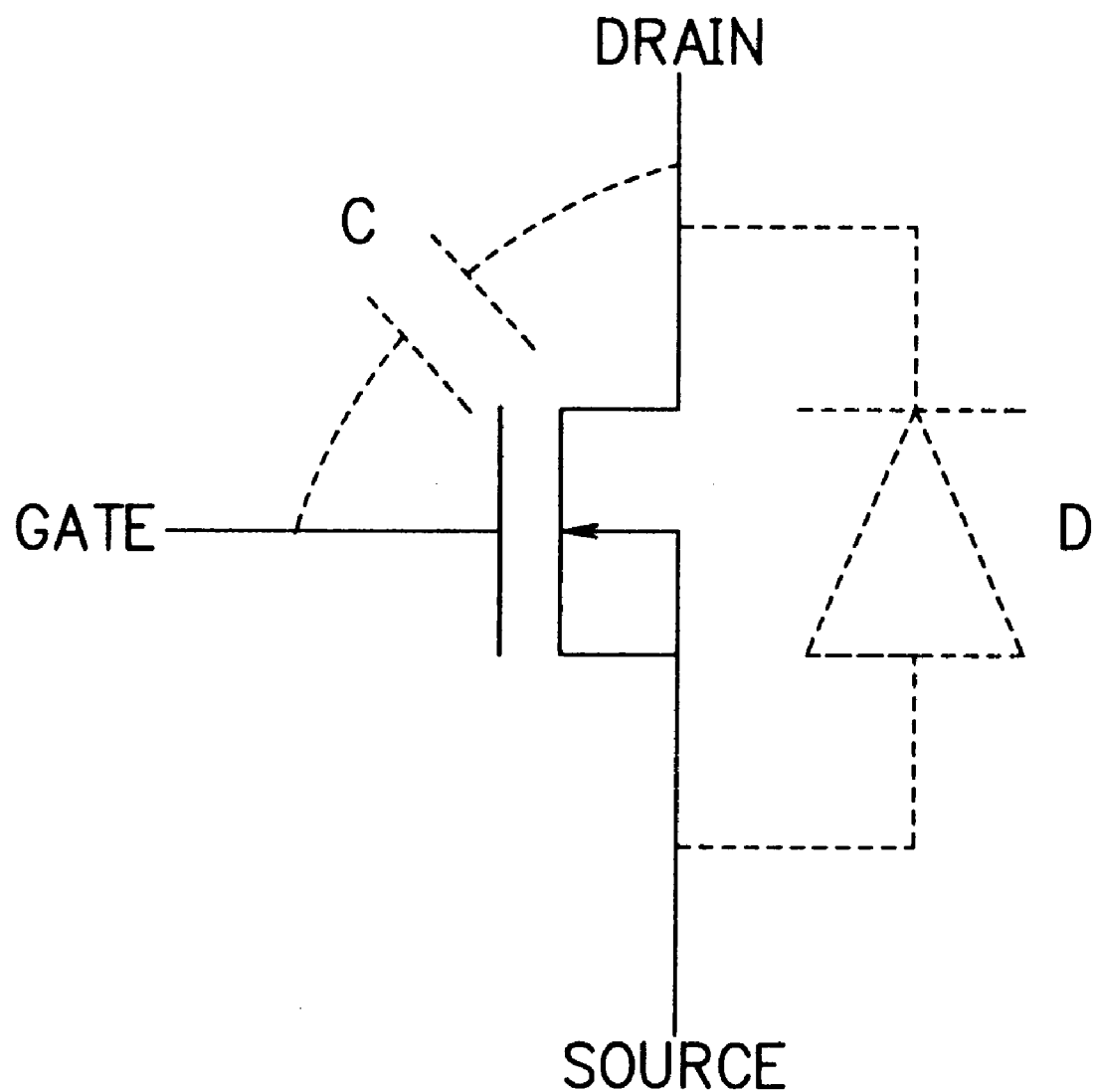
FIG. 8 is a conceptual diagram showing the construction of a switching transistor of the conventional type and the present invention.

In FIG. 9, the same elements as the conventional piezoelectric transducing inverter 29 shown in FIG. 1 have the same reference numbers and operate as stated above, therefore the same explanation is omitted.

The difference between the first embodiment of the piezoelectric transducing inverter 51 of the present invention shown in FIG. 9 and that of the conventional type shown in FIG. 1 is the point that the first embodiment of the piezoelectric transducing inverter 51 connects pull-up resistors 24 and 25 to switching transistors 7 and 8 respectively.

With these pull-up resistors 24 and 25, at the time when the electric connection between the frequency divider 9 and the gates of switching transistors 7 and 8 is broken, biasing the switching transistors, the first embodiment makes turning on the switching transistor by compulsion possible.

Next, the operation of the first embodiment of the piezoelectric transducing inverter of the present invention is explained.

By inputted the half wave voltages $V_{d1}$ and $V_{d2}$ of the sine wave or the approximate signal of the sine wave alternately outputted from the frequency divider 9 to one side and the other side of the primary electrode of the piezoelectric transducer 1, the piezoelectric transducing inverter 1 is driven by the equivalent sine wave or the approximate signal of the sine wave and outputs the voltage $V_0$ which is boosted N times $V_{d1}$ and $V_{d2}$ from the secondary electrode.

This voltage $V_0$ is applied to the load 2 and the feed back current $I_0$ flowing from the load 2 is inputted to the frequency control circuit 3. The frequency control circuit 3 generates a frequency two times that of the frequency driving the piezoelectric transducer 1 from the frequency divider 9 and continues the sweeping of the driving frequency until the feed back current $I_0$ from the load 2 becomes a predetermined value and stops at the predetermined value.

By the voltage $V_{d1}$ or $V_{d2}$ inputting to the piezoelectric transducer 1 and to the driving voltage control circuit 10, even if the DC voltage $V_{DD}$ becomes large, the peak voltage of the voltage $V_{d1}$ and $V_{d2}$ is controlled to a certain value. The dimmer 11 outputs a control signal which is low enough in frequency than the driving frequency to the driving voltage control circuit 10 and the power supplied to the booster 4 is controlled by time division and the effective value of the voltage $V_0$ provided to the load 2 or the effective value of the $I_0$ flowing to the load 2 is able to be decreased. During periods when power is not supplied to the booster 4, the frequency of the VCO (voltage controlled oscillator) is not to be changed, and the dimmer 11 outputs a hold signal to the frequency control circuit 3.

During a normal state where the frequency divider 9 and the gates of the switching transistors 7 and 8 are electrically connected, resistance values of pull-up resistors 24 and 25 are set to be high enough to not disturb the driving power of the frequency divider 9.

During an abnormal state where the frequency divider 9 and either gate of the switching transistor 7 and 8 is electrically disconnected, the pull-up resistor 24 or 25 biases the switching transistor and makes an electric route flowing a large current to the fuse 12 and blows the fuse 12 and operates to stop the circuit.

Therefore, according to the first embodiment of the piezoelectric transducing inverter of the present invention, even if the electric connection between the frequency divider 9 and the switching transistor 7 or 8 is broken, the generation of smoke from the switching transistor 7 or 8 is able to be prevented.

Next, a second embodiment of the piezoelectric transducing inverter of the present invention is explained. FIG. 10 is a block diagram showing the construction of the second embodiment of the piezoelectric transducing inverter of the present invention. In FIG. 10, the same elements as the first embodiment of the piezoelectric transducing inverter of the present invention shown in FIG. 9 have the same reference numbers and operate the same as the first embodiment, therefore the same explanation is omitted.

The difference between the second embodiment of the piezoelectric transducing inverter 52 of the present invention and the first embodiment of the piezoelectric transducing inverter 51 of the present invention is that the second embodiment additionally has a constant-voltage circuit 61 which outputs a constant DC voltage even when the DC voltage $V_{DD}$ fluctuates and the pull-up resistors 24 and 25 are connected to this output.

In the first embodiment of the present invention shown in FIG. 9, in the case where the voltage range of the DC voltage $V_{DD}$ is wide, the voltage which biases the gate of the switching transistor changes. However, even this bias voltage is within the rated voltage between the gate and the source of the switching transistor but is too high to apply to the switching transistor, the on-resistance values of the switching transistor 7 and 8 become very small.

During an abnormal state where the electric connection between the frequency divider 9 and the gate of the switching transistor breaks, art excessive drain current flows and before the fuse 12 blows, this may cause the generation of smoke. Therefore, at the piezoelectric transducer driving circuit operating with a wide range DC voltage VDD, the pull-up to the DC voltage $V_{DD}$ is not preferable and setting the gate voltage of this switching transistor to a suitable bias value is important.

For example, in the case where the fuse 12 is a rated current 1.25 A and an instant blow type, the coils 5 and 6 are 58 μH, named 2SK2111 transistors are used for the switching transistor 7 and 8, and in the abnormal state where the electric connection between the frequency divider 9 and either gate of the switching transistors 7 and 8 breaks, and the DC power supply $V_{DD}$ is 12 V and the pull-up resistance value is 1 MΩ, an on-resistance value becomes small and an excessive drain current flows and before the fuse 12 blows, the switching transistor generates smoke. However, in the case where the DC power supply $V_{DD}$ is 12 V, the output voltage of the constant-voltage circuit 61 is 5 V and the pull-up resistance value is 100 kΩ, the on-resistance value does not become so small and the excessive drain current does not flow, therefore before the switching transistor generates smoke the fuse 12 blows and the operation of the circuit is able to be safely stopped.

Therefore, the second embodiment of the piezoelectric transducing inverter 52 of the present invention efficiently drives the piezoelectric transducer 1 and is highly used in general, having a small size and low cost, and is operated in a wide range of DC voltage $V_{DD}$. Moreover, the constant-voltage circuit 61 is provided and the pull-up is implemented on the output of the constant-voltage circuit 61, and during the abnormal state where the electric connection between the frequency divider 9 and the gate of the switching transistor breaks, the generation of smoke from the switching transistor is able to be prevented.

Next, a third embodiment of the piezoelectric transducing inverter of the present invention is explained. FIG. 11 is a block diagram showing the construction of the third embodiment of the piezoelectric transducing inverter of the present invention. In FIG. 11, the same elements as the first embodiment of the piezoelectric transducing inverter of the present invention shown in FIG. 9 have the same reference numbers and operate the same as the first embodiment, therefore the same explanation is omitted.

The difference between the third embodiment of the piezoelectric transducing inverter 53 of the present invention and the first embodiment of the piezoelectric transducing inverter 51 of the present invention is that the third embodiment uses a single voltage as the DC voltage $V_{DD}$ and pull-down resistors 26 and 27 are connected to the switching transistors 7 and 8 respectively.

With biasing the switching transistor 7 or 8 by the divided voltage value divided by the pull-up resistor 24 or 25 and the pull-down resistors 26 or 27, during an abnormal state where the electric connection between the frequency divider 9 and one gate of the switching transistor 7 or 8 is lost, a large current flows in the fuse 12 and the generation of smoke from the switching transistor is able to be prevented. Therefore, in the piezoelectric transducing inverter which uses a single voltage as the DC voltage $V_{DD}$, the pull-up partner of the pull-up resistor is able to be connected to the DC voltage $V_{DD}$ or the fuse 12, an additional power supply for biasing, for example the constant-voltage circuit 61 in FIG. 10, is not necessary.

Even when the DC voltage $V_{DD}$ biases the switching transistor by the divided voltage value of the pull-up resistor and the pull-down resistor, in the case where the voltage is too small to make a current route flowing a large current to the fuse 12, the first or second embodiment shown in FIG. 9 or 10 is applied.

According to the third embodiment of the piezoelectric transducing inverter of the present invention, in the piezoelectric transducer driving circuit operated by the wide range of DC voltage $V_{DD}$, the piezoelectric transducing inverter efficiently drives the piezoelectric transducer and is widely used, having a small size and low cost. And during an abnormal state where the electric connection between the frequency divider 9 and one gate of the switching transistors is lost, the generation of smoke etc. from the switching transistor is able to be prevented.

As explained above, the present invention is able to provide a piezoelectric transducing inverter which efficiently drives the piezoelectric transducer and is widely used in general, which has small size and low cost. The piezoelectric transducing inverter of the present invention improves safety in the abnormal state where the electric connection between the frequency divider 9 and either gate of the switching transistors is lost, wherein the gate of the switching transistor is biased by the resistor and before the generation of smoke etc. from the switching transistor occurs the fuse is blown.

Moreover, the present invention is able to provide a piezoelectric transducing inverter which is able to obtain a transduced voltage in high efficiency with a wide input voltage range by controlling the diving voltage of the piezoelectric transducer with a predetermined voltage.

Furthermore, the present invention is able to provide a piezoelectric transducing inverter in which the values of the first, second, third and fourth resistors are high enough to prevent the hindrance of the driving capability of the first and the second switching transistors caused by the frequency divider.

While the present invention has been described with reference to the particular illustrative embodiments, it is not to be restricted by those embodiments but only by the appended claims. It is to be appreciated that those skilled in the art can change or modify the embodiments without departing from the scope and spirit of the present; invention.

What is claimed is:

1. A piezoelectric transducing inverter which provides a booster means having a piezoelectric transducer that is inputted a voltage from a primary electrode and outputs an AC voltage at a secondary electrode utilizing a piezoelectric effect, a first coil whose one end is connected to one side of the primary electrode of said piezoelectric transducer, a first switching transistor whose one end is connected to one side of the primary electrode of said piezoelectric transducer, a second coil whose one end is connected to the other side of the primary electrode of said piezoelectric transducer, a second switching transistor whose one end is connected to the other side of the primary electrode of said piezoelectric transducer, and a frequency divider which outputs gate signals to alternately drive said first switching transistor and said second switching transistor respectively, comprising:

a first resistor whose one end is connected to the gate of said first switching transistor and whose the other end is connected to a fuse or a DC power supply; and a second resistor whose one end is connected to the gate of said second switching transistor and whose the other end is connected to said fuse or said DC power supply.

2. A piezoelectric transducing inverter in accordance with claim 1, comprising:

a third switching transistor which is connected to the other end of said first coil and the other end of said second coil:

a diode which is connected to the other end of said first coil and the other end of said second coil; and a driving voltage control circuit which controls the driving voltage of said piezoelectric transducer to a predetermined voltage by on/off control of said third switching transistor.

3. A piezoelectric transducing inverter in accordance with claim 1, wherein:

the resistance values of said first resistor and said second resistor are high enough not to hinder the driving capability of said first switching transistor and said second switching transistor by said frequency divider.

4. A piezoelectric transducing inverter in accordance with claim 2, wherein:

the resistance values of said first resistor and said second resistor are high enough not to hinder the driving capability of said first switching transistor and said second switching transistor by said switching frequency divider.

5. A piezoelectric transducing inverter which provides a booster means having a piezoelectric transducer that is inputted a voltage from a primary electrode and outputs an AC voltage at a secondary electrode utilizing a piezoelectric effect, a first coil whose one end is connected to one side of the primary electrode of said piezoelectric transducer, a first switching transistor whose one end is connected to one side of the primary electrode of said piezoelectric transducer, a second coil whose one end is connected to the other side of the primary electrode of said piezoelectric transducer, a second switching transistor whose one end is connected to the other side of the primary electrode of said piezoelectric transducer, and a frequency divider which outputs gate signals to alternately drive said first switching transistor and said second switching transistor respectively, comprising:

- a constant-voltage circuit outputting a constant DC voltage;
- a first resistor whose one end is connected to the gate of said first switching transistor and whose the other end is connected to said constant-voltage circuit; and
- a second resistor whose one end is connected to the gate of said second switching transistor and whose the other end is connected to said constant-voltage circuit.

6. A piezoelectric transducing inverter in accordance with claim 5, comprising:

- a third switching transistor which is connected to the other end of said first coil and the other end of said second coil;
- a diode which is connected to the other end of said first coil and the other end of said second coil; and
- a driving voltage control circuit which controls the driving voltage of said piezoelectric transducer to a predetermined voltage by on/off control of said third switching transistor.

7. A piezoelectric transducing inverter in accordance with claim 5, wherein:

the resistance values of said first resistor and said second resistor are high enough not to hinder the driving capability of said first switching transistor and said second switching transistor by said frequency divider.

8. A piezoelectric transducing inverter in accordance with claim 6, wherein:

the resistance values of said first resistor and said second resistor are high enough not to hinder the driving capability of said first; switching transistor and said second switching transistor by said frequency divider.

9. A piezoelectric transducing inverter which provides ;a booster means having a piezoelectric transducer that is inputted a voltage from a primary electrode and outputs an AC voltage at a secondary electrode utilizing a piezoelectric effect, a first coil whose one end is connected to one side of the primary electrode of said piezoelectric transducer, a first switching transistor whose one end is connected to one side of the primary electrode of said piezoelectric transducer, a second coil whose one end is connected to the other side of the primary electrode of said piezoelectric transducer, a second switching transistor whose one end is connected to the other side of the primary electrode of said piezoelectric transducer, and a frequency divider which outputs gate signals to alternately drive said first switching transistor and said second switching transistor respectively, comprising:

- a first resistor whose one end is connected to the gate of said first switching transistor and whose the other end is connected to a fuse or a DC power supply;
- a second resistor whose one end is connected to the gate of said second switching transistor and whose the other end is connected to said fuse or said DC power supply;
- a third resistor whose one end is connected to the gate of said first switching transistor and whose the other end is connected to a ground; and
- a fourth resistor whose one end is connected to the gate of said second switching transistor and whose the other end is connected to a ground.

10. A piezoelectric transducing inverter in accordance with claim 9, comprising:

- a third switching transistor which is connected to the other end of said first coil and the other end of said second coil;
- a diode which is connected to the other end of said first coil and the other end of said second coil; and
- a driving voltage control circuit which controls the driving voltage of said piezoelectric transducer to a predetermined voltage by on/off control of said third switching transistor.

11. A piezoelectric transducing inverter in accordance with claim 9, wherein:

the resistance values of said first resistor, said second resistor, said third resistor and said fourth resistor are high enough not to hinder the driving capability of said first switching transistor and said second switching transistor by said frequency divider.

12. A piezoelectric transducing inverter in accordance with claim 10, wherein:

the resistance values of said first resistor, said second resistor, said third resistor and said fourth resistor are high enough not to hinder the driving capability of said first switching transistor and said second switching transistor by said frequency divider.

13. A piezoelectric transducing inverter which inputs the signals outputted from the frequency divider to the gates of the two switching transistors respectively and drives the piezoelectric transducer and outputs a transduced voltage, wherein:

at the time when an abnormal state that the electric connection between said frequency divider and either gate of said two switching transistors is lost occurs, the piezoelectric transducing inverter biases said switching transistor and flows a current to the fuse and blows the fuse and prevents the generation of smoke.

14. A piezoelectric transducing inverter in accordance with claim 13, wherein:

in order to flow the current to said fuse, said two switching transistors have resistors respectively whose one end is connected to the gate of the switching transistor and whose the other end is connected to said fuse or the DC power supply.

15. A piezoelectric transducing inverter in accordance with claim 13, wherein:

in order to flow the current to said fuse, said two switching transistors have resistors respectively whose one end is connected to the gate of the switching transistor and whose the other end is connected to the constant-voltage circuit supplying a constant DC voltage and said constant-voltage circuit is connected to said fuse or said DC power supply.

16. A piezoelectric transducing inverter in accordance with claim 13, wherein in order to flow the current to said fuse, said two switching transistors, comprising:

- a first resistor whose one end is connected to the gate of the switching transistor and whose the other end is connected to said fuse or the DC power supply; and
- a second resistor whose one end is connected to the gate of said switching transistor and whose the other end is connected to a ground.

17. A piezoelectric transducing inverter comprising:

- a frequency divider having a first output and a second output, wherein said second output is the logical complement of said first output;

a piezoelectric transducer having a first primary electrode, a second primary electrode, and a secondary electrode;

a plurality of switching transistors comprising a first switching transistor having a first gate connected to said first output and having a first output terminal at least connected to said first primary electrode, and a second switching transistor having a second gate connected to said second output and having a second output terminal at least connected to said second primary electrode;

a fuse connected between a power source and at least said first switching transistor gate and said second switching transistor gate; and a switching transistor biasing means, said switching transistor biasing means ensuring protection of said plurality of switching transistors from burnout and smoking whenever at least one of said first gate and said second gate is disconnected from said first output and said second output respectively by causing a current to flow through said fuse sufficient to blow said fuse.

18. The piezoelectric transducing inverter of claim 17, wherein said switching transistor biasing means comprises a first resistor and a second resistor, said first resistor and said second resistor each having one end connected respectively to said first gate and said second gate, and each of said first and said second resistors having the other end connected to said power source through said fuse, wherein an electrical path is formed in order to flow current through said fuse whenever at least one of said first gate and said second gate is disconnected from said first output and said second output respectively.

19. The piezoelectric transducing inverter of claim 17, further comprising a constant voltage circuit for supplying a constant DC voltage, wherein said switching transistor biasing means comprises a first resistor and a second resistor, said first resistor and said second resistor each having one end connected respectively to said first gate and said second gate, and each of said first and said second resistors having the other end connected to said constant voltage circuit power source, wherein said constant voltage circuit is connected to said power source through said fuse, and wherein an electrical path is formed in order to flow the current to said fuse whenever at least one of said first gate and said second gate is disconnected from said first output and said second Output respectively.

20. The piezoelectric transducing inverter of claim 17, wherein said switching transistor biasing means comprises a first voltage divider and a second voltage divider, said first voltage divider comprising a first set of two series-connected resistors, wherein one end of a first resistor is connected to said power source through said fuse, and the other end of said first resistor is connected to said first gate and to one end of a second resistor, and wherein the other end of said second resistor is connected to a ground, said second voltage divider comprising a second set of two series-connected resistors, wherein one end of a third resistor is connected to said power source through said fuse, and the other end of said third resistor is connected to said second gate and to one end of a fourth resistor, and wherein the other end of said fourth resistor is connected to said ground, said first and said second voltage dividers providing an electrical path to flow the current through said fuse whenever at least one of said first gate and said second gate is disconnected from said first output and said second output respectively.

* * * * *